March 31, 1964 P. D. GRIBBLE ETAL 3,127,557
AERIAL GEOPHYSICAL SURVEY APPARATUS HAVING TRANSMITTER
AND RECEIVER COILS MOUNTED ON OPPOSITE WINGTIPS OF AN
AIRCRAFT SO AS TO MINIMIZE GUST EFFECTS
Filed Aug. 3, 1956                                      2 Sheets-Sheet 2

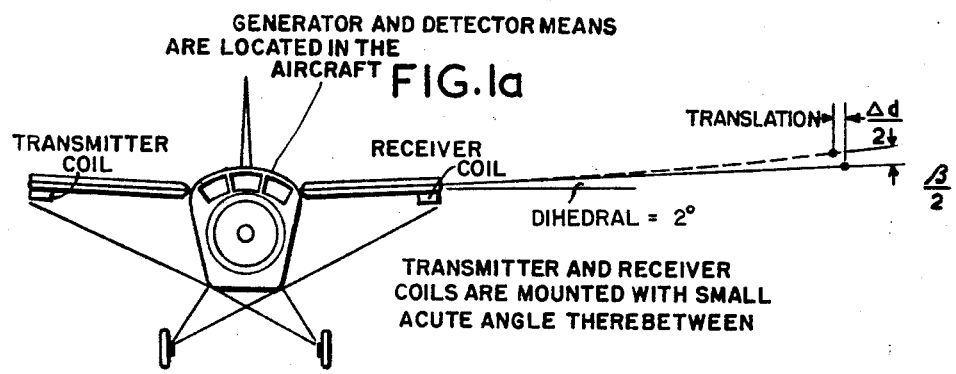
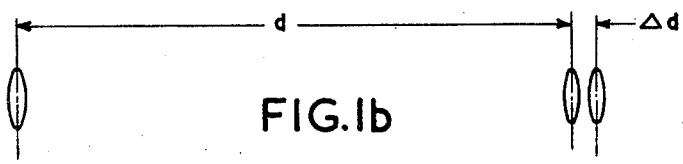
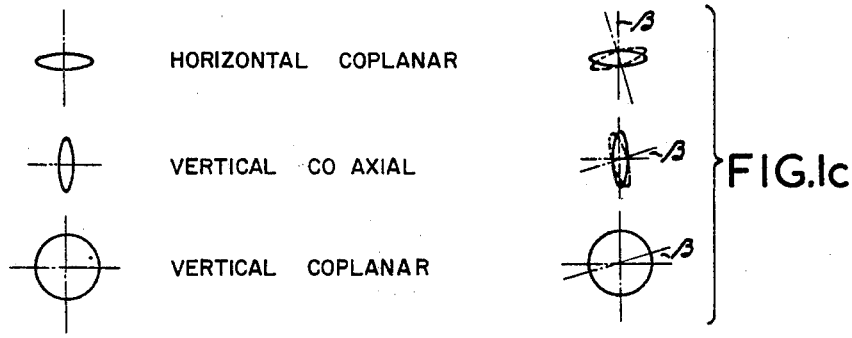
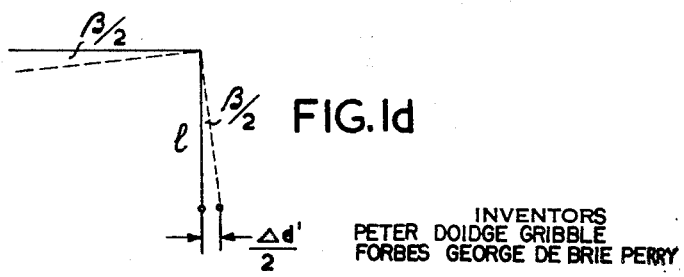

INVENTORS
PETER DOIDGE GRIBBLE
FORBES GEORGE DE BRIE PERRY
BY
AGENT

United States Patent Office 3,127,557
Patented Mar. 31, 1964

3,127,557
AERIAL GEOPHYSICAL SURVEY APPARATUS HAVING TRANSMITTER AND RECEIVER COILS MOUNTED ON OPPOSITE WINGTIPS OF AN AIRCRAFT SO AS TO MINIMIZE GUST EFFECTS
Peter Doidge Gribble, Old Coulsdon, and Forbes George De Brie Perry, Felbridge, England, assignors to The Mullard Radio Valve Company Limited, London, England
Filed Aug. 3, 1956, Ser. No. 601,973
Claims priority, application Great Britain Aug. 5, 1955
6 Claims. (Cl. 324—4)

Eddy-current methods of prospecting used by survey teams working on the ground are well known. A large transmitting coil is erected in the region to be searched and a receiving coil is placed in one of a number of carefully sited positions in the vicinity. The coils are correctly oriented and for a given alternating current in the transmitting coil the E.M.F. induced in the receiver coil is measured. In the absence of any disturbing material in the magnetic field of the transmitting coil, the primary field, $H_p$, at the receiving coil and hence the E.M.F. E induced in the receiving coil depend only on the geometry of the system of the coils and on the value of the current I in the transmitting coil. This is approximately true of two coils mounted near the ground provided the operating frequency is low enough to render the ground conductivity negligible in its effect and provided there are no deposits in the vicinity having relatively high conductivity. If such deposits exist then eddy-currents will be induced in them and these will give rise to a secondary field, $H_s$, which will distort the primary field and, in general, alter the E.M.F. in the receiving coil. Thus the presence of conducting deposits may be detected. In general the conducting deposits will change the amplitude, phase and direction of the primary field and any one or combination of these changes may be detected. Another way of regarding this is that the presence of conducting material changes the mutual, or transfer, impedance and this change is measured. The change due to a spherical conducting body of radius R located at a distance $h_1$ from the transmitting coil and $h_2$ from the receiving coil when these two coils are a distance $d$ apart has been given by:

$$\frac{H_s}{H_p} \text{ or } \frac{\Delta_E}{I} = K\frac{R^3 d^3}{h_1^3 h_2^3}(M+jN)$$

where K is a constant, and M and N are functions of $R\sqrt{\sigma\mu\omega}$, $\sigma$ being the conductivity of the sphere, $\mu$ the permeability of the air and overburden media and of the ore body (that is to say the permeability of the ore body is taken as equal to that of the free space which is unity in the C.G.S. system) and $\omega$ is the angular frequency.

The disadvantage of the ground method is that it is very slow, and so attention has been turned to mobile units, using road vehicles or aircraft.

It is obvious that as soon as airborne equipment is considered, the values $h_1$ and $h_2$ increase and become approximately equal to the height, $h$, of the aircraft above the centre of the ore body. Thus:

$$\frac{H_s}{H_p} = K\frac{R^3 d^3}{h^6}(M+jN)$$

To compensate for the reduction of sensitivity due to the increase of $h$ previous systems have increased $d$ by mounting a transmitting coil on an aircraft and a receiving coil on a separate vehicle, e.g. another aircraft flying in formation or a drogue towed behind and below the aircraft. The two coils are thus free to move relative to one another and the mutual impedance constantly changes as the two aircraft or the aircraft and drogue pitch, roll and yaw in flight.

Various attempts have been made to cancel the influence of this movement. In U.S. patent application serial No. 568,621, filed February 29, 1956, now Patent No. 2,995,699 issued August 8, 1961, assigned to the assignee of the instant invention, it is proposed to use geophysical apparatus in which the two coils of the system are mounted as far apart as possible on an air frame, for example one on each wing-tip. This latter arrangement preferably requires an aircraft having a long wingspan constructed as rigidly as possible. The two coils are mounted at each wing-tip, for example in horizontal co-planar position, and the mutual or transfer impedance is measured and continuously recorded. In this specification horizontal co-planar coils are to be understood to mean coils which have the axes nominally vertical, located in the bending plane of the wing and parallel to or inclined a few degrees; vertical co-axial coils are to be understood to mean coils which have their axes nominally horizontal, located in the plane of winding of the wing and aligned or within a few degrees of alignment; vertical co-planar coils are to be understood to mean coils having their axes normal to the plane of bending of the wing, that is to say nominally parallel to the line of flight of aircraft. Such a system of horizontal coils would give the best response to a horizontal or tabular ore body. It would obviously be possible to have in addition vertical co-planar coils and vertical co-axial coils and each system, operating at a somewhat different frequency, would be most sensitive to slablike ore bodies lying in a plane parallel to the plane of the coils. However, the sensitivity to a spherical ore body of the second and third systems mentioned are only ¼ and ⅛ times respectively that of the system with the horizontal coils. Having sacrificed response (by reducing distance $d$) for the advantage of a nearly rigid system, apparatus must be provided that will resolve very small changes due to ore bodies and distinguish them from spurious responses due to magnetic noise, thermal and other drifting effects in the apparatus itself, very small movements of the coils relative to each other and very small movements of the coils relative to the air frame.

If the coils are mounted as rigidly as possible and as far away from the airframe as possible the effects of movements relative to the airframe may be made small. These are troublesome chiefly because of variable eddy-current coupling of the coils through the material of the airframe (particularly in the case of a metal wing) and the vicinity of movable control surfaces such as ailerons.

Changes of coupling between the transmitting and receiving coils will occur if there is any movement in the coils or between either coil and the airframe. Such movements might occur as a result of a variety of causes and they may be divided into three types, (I) vibrations, (II) random movements chiefly due to gusty conditions and (III) slow movements due to changes of all upweight as the fuel is consumed, and/or temperature effects.

The effect of vibration may be eliminated by narrow bandwidth (or long integrating time) detector circuits. The changes of coupling due to slow movements may be corrected in the detector by motors which automatically balance the reference coil and receiver coil voltages for zero resultant. The changes of coupling due to gusts have time characteristics which may be very similar to ore-body responses. They may thus give rise to spurious deflections on the record and means must be provided for identifying them and/or reducing or minimizing them. Identification may be effected by producing a simultaneous recording of the vertical acceleration of the fuselage or of the strain in the wing strut.

In considering the reduction of spurious gust responses the various ways in which gusts may produce changes in coupling must be considered. The least predictable part of change is in the eddy current coupling with a metal wing structure. This change may be caused by the coils moving relatively to the metal structure or by movement within the structure varying the resistance of the eddy current paths. These changes of coupling may best be made small by mounting the coil assemblies outboard of the wingtips on non-metallic structures made as rigid as possible so that random movement between the coils and the metal wingtips is made as small as possible. Changes of eddy current coupling with the ailerons normally can give spurious responses when the aileron movement is greater than would be normal in straight and level flight.

The largest change of coupling due to gusts normally arises from wing tip deflection resulting from the bending of the wing (in most aircraft the torsional rigidity of the wing is such that torsion effects can be ignored).

These give rise to (I) translation i.e. a change in the separation $d$ of the coils due to the bowing and hinging of the wing spans as they are strained and (II) rotation i.e. a change in the angle between the axes of the coils as the wing tips are deflected. These effects are illustrated in FIGURE 1a of the drawings. From FIGURE 1c it is evident that if the coils are vertical and co-planar then rotation does not change the coupling.

The present invention is concerned with horizontal co-planar coils and vertical co-axial coils as defined above, and has for its object to reduce the effect of the changes of coupling of the coils caused by the translation and rotation of the coils due to wing bending. In the case of vertical co-planar coils the coupling variations due to translation should be reduced since there is no variation due to rotation. In accordance with the invention the coils are located at or near opposite tip portions of a wing of an aircraft in such manner that, net changes in coupling give rise to spurious signals which are comparable with or less than the noise level of the receiver.

Actual cancellation may be obtained at a given condition of bending, and the optimum condition for such cancellation may be obtained by adjusting various factors. Such adjustment may, for example, be effected by varying the initial angle between the coils and/or by mounting the centres of the coils at a predetermined distance below the wing, this latter having the effect of reducing the translation at the coils. Thus the translation effect may be rendered more nearly comparable with the angular effect so that the degree of cancellation is increased to a maximum and extended over a wider range of wing bending conditions.

According to a further aspect of the invention, when using horizontal co-planar or vertical coaxial coils, the coils are located in such manner that changes in coupling between said coils due to translation caused by wing bending and due to rotation caused by wing bending are minimized for a given range of gust loading conditions.

In general it is not necessary to reduce the spurious responses due to gusts substantially below the noise level of the receiver. However, in accordance with said further aspect of the invention, by mounting the coils in such manner that net changes of coupling due to translation and rotation of the coils caused by wing bending are minimized for a given range of gust loading conditions, the advantage is achieved that for the same transmitter power the signal to effective noise ratio may be improved.

By mounting the coils outboard of the wings a further advantage is achieved in that the effects due to variable eddy-current coupling of the coils through the material of the airframe and the movable control surfaces such as ailerons are small.

The same result attaches to vertical co-planar coils.

The characteristic of a given wing may be modified to suit the requirements of the above compensation method by applying loads to the wing. It is generally known that by carrying part of the aircraft payload distributed along the wing as point loads, alleviation of wing bending is achieved; hence the popluarity of wing tip fuel tanks and the suspension of power units along the span. The imposition of a wing point load can however be used as a modifier of the bent shape under flying loads and therefore also under gust conditions. To give an example of a practical case, for a de Havilland Otter aircraft the normal flight flexures of the wing give an upward deflection with an associated reduction of tip coil separation and change of coil angle relative to the vertical. By suspending roughly 850 lbs. at each tip (the weight of a 100 gallon tip tank full of fuel) the vertical deflection due to air loading (and hence gust loading) can be eliminated completely, the angular change or rotation of the coils relative to the vertical is reversed and the squarelaw component of the translation or span shortening is reduced by approximately 60%.

In practice, the latter feature is normally present to a greater or lesser extent due to the weight of the coils.

The invention will now be explained more fully with reference to a specific example and preferred embodiment illustrated in the drawings.

FIG. 1a of the drawings shows generally an aircraft with transmitter and receiver coils mounted near the respective opposite wingtips, with relative translation and rotation due to flight conditions also being indicated;

FIG. 1b shows schematically coil separation on the aircraft compared with coil dimension;

FIG. 1c shows angular relationships between various corresponding transmitter-receiver coil combinations due to flight conditions;

FIG. 1d shows one relationship between outward swing of the coils and change in wing-tip slope.

Figure 2:
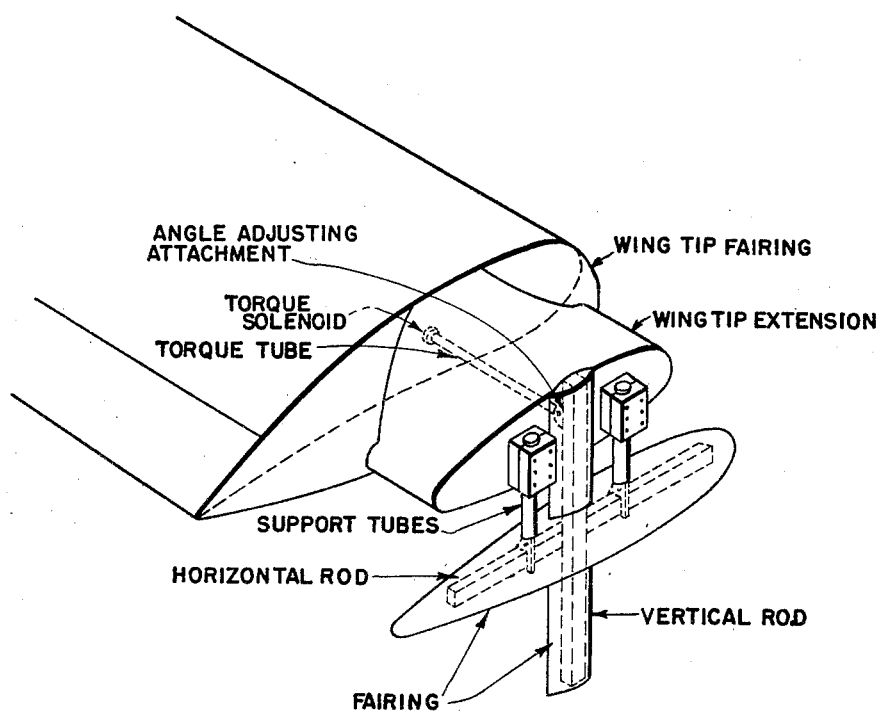
FIG. 2 shows diagrammatically one means of securing the coils to the wings.

The embodiment is applicable to a monoplane highwing strutted metal aircraft having 2° dihedral, though the invention is not limited thereto. As to the signal responses, these are given, where convenient, as parts in a million where one million represents the theoretical signal obtained with the system in free space.

A quantitative treatment of the responses due to translation will now be given:

The two coils mounted either in vertical coaxial positions or horizontal co-planar positions have a mutual coupling M which varies inversely as $d^3$ where $d$ is the separation assumed large compared with the coil dimension (see FIGURE 1b). If $d$ changes to $d+\Delta d$ and as a result M changes to $M+\Delta M$, then, assuming $\Delta d$ is very small, to a sufficient approximation:

$$\frac{\Delta M}{M} = \frac{-3\Delta d}{d} \qquad (7)$$

For horizontal co-planar or vertical co-axial coils for the change of coupling due to slight rotation of the coil relative to the other the same cosine law holds in both cases.

When the coils are exactly co-planar (or co-axial) the coupling will be M. If the relative rotation $\beta$ occurs the coupling will change to $M+\sigma M$ given by $$M + \sigma M = M \cos \beta$$

Using the cosine series, and assuming that $\beta$ is very small, this becomes $$\frac{\sigma M}{M} = \frac{-\beta^2}{2} \qquad (8)$$

If the coils are set initially at an angle $\alpha$ the steady coupling may be represented by:

$$m = M + \sigma M = M \cos \alpha$$

If now a gust produces an extra rotation $\beta$ then the coupling will change to $m+\sigma m$ given by:

$$m+\sigma m = M \cos(\alpha+\beta)$$

Therefore $$1+\frac{\sigma m}{m} = \cos \beta - \tan \alpha \sin \beta$$

Expressing the trigonometrical functions as series, and assuming $\alpha$ and $\beta$ are small, it is permissible to ignore terms higher than the second order so that $$\frac{\sigma m}{m} = -\beta\alpha - \frac{\beta^2}{2} \quad (9)$$

An up-gust of 10 ft./sec. corresponds to an increase of loading of 0.7 $g$ for the aforementioned aircraft flying at 100 m.p.h. The average duration of the gust would be approximately 0.8 second. During the first part of this period there will be an increase in the wing loading and during the second part the loading will be somewhat less than normal. Several investigations have been made into the relationships between wing-tip deflection and wing-loading for the above-mentioned aircraft. The figures deduced are as follows:

The approach of the coils for a change of acceleration from zero to 1 $g$ is given as 0.216" of which 0.206" is linear with change of acceleration and 0.01" is proportional to the square of this change of acceleration. If $\Delta g$ is now used to denote the change of acceleration divided by the acceleration due to gravity then:

$$-\Delta d = 0.206(1+\Delta g) + 0.01(1+\Delta g)^2$$
$$-(0.206+0.01) = 0.226\Delta g + 0.01\Delta g^2$$

Taking $d = 61$ feet i.e. 732 inches $$\frac{-\Delta d}{d} = \frac{-\Delta d}{732} = 309\Delta g \cdot 10^{-6} + 13.7 \Delta g_2 \cdot 10^{-6} \quad (10)$$

if $$\Delta g = 0.7 \text{ then } -\frac{\Delta d}{d} = 223 \times 10^{-6} \quad (11)$$

This approach would be appreciably less if the 2° dihedral on the main plane (FIG. 1a) were substantially reduced, but this is not practicable.

The change of wing-tip slope for the above-mentioned type of aircraft was found to be 25.5 $g$ minutes or 0.00741 $g$ radians and when $\Delta g = 0.7$, the relative rotation $\beta$ is $$2 \times 0.00741\Delta g = 0.0148\Delta g \text{ i.e. } \beta = 0.0104 \text{ radians} \quad (12)$$

The above data relate only to the aircraft as modified by the installation of the wing-tip apparatus already described.

Due to coil approach the change of coupling when a gust producing an increase in acceleration of 0.7 $g$ is encountered is obtained by substitution of Equation 11 in Equation 7.

$$\frac{\Delta M}{M} = +3 \times 223 \times 10^{-6} = 670 \times 10^{-6}$$

Such a large spurious response is, on its own, quite intolerable because it is greater than the probable response from a fairly large ore body.

Due to coil rotation the change of coupling when the same gust is encountered is obtained by substitution of Equation 13 in Equation 8 or 9 depending on the initial angle between the coils. If this is zero then $$\frac{\sigma M}{M} = -0.0104^2 = -54 \times 10^{-6}$$

It is obvious that the responses obtained above tend to cancel.

If two channels are employed channel A may use horizontal co-planar coils and channel B may use vertical co-planar coils.

Thus for channel A there will be some cancellation of the gust response. An inspection of Equation 9 shows that by setting the initial angle between the coils in steady flight to some value $\alpha$ the translation and rotation responses may be arranged to cancel at any given value of $g$.

For example, if it is desired to have the effects cancel at an increase in $g$ of 0.5 then from Equation 10:

$$\frac{-\Delta d}{d} = 158 \times 10^{-6}$$

and $$\frac{\Delta M}{M} = 474 \times 10^{-6}$$

From Equation 12, the relative rotation $$\beta = 0.0148 \times 0.5 = 0.0074$$

From Equation 9:

$$\frac{\sigma m}{m} = -0.0074\alpha - \frac{0.0074^2}{2}$$
$$= -474 \times 10^{-6}$$

for cancellation $$\alpha = 0.0603 \text{ radians} = 3.46 \text{ degrees}$$

If then the coils are set, in steady flight, to have an angle of 3.46 degrees between them, the net gust response at various increments in $g$ is as follows:

| Increase in $g$ | Net gust response | Decrease in $g$ | Net gust response |
|---|---|---|---|
| 0.1 | $2.8 \times 10^{-6}$ | 0.1 | $-4.0 \times 10^{-6}$ |
| 0.2 | $4.2 \times 10^{-6}$ | 0.2 | $-9.3 \times 10^{-6}$ |
| 0.3 | $4.2 \times 10^{-6}$ | 0.3 | $-16.0 \times 10^{-6}$ |
| 0.4 | $2.8 \times 10^{-6}$ | 0.4 | $-24.0 \times 10^{-6}$ |
| 0.5 | $0 \times 10^{-6}$ | | |
| 0.6 | $-4.0 \times 10^{-6}$ | | |
| 0.7 | $-9.5 \times 10^{-6}$ | | |
| 0.8 | $-16.4 \times 10^{-6}$ | | |

It is evident, therefore that the changes in coupling due to wing-bending may be reduced by increasing the effect of coil rotation to make it more equal to the opposed effect of coil translation.

Reduction of the difference between the two effects can also be achieved by setting coils initially exactly coaxial or co-planar and reducing the approach of the coils due to wing bending. As the wing-tip is deflected upwards the rods will swing outwards relative to the wing-tip. A resultant inward swing of a desired magnitude can be made for any particular value of $g$.

Referring to FIGURE 1d the outward swing of the coils $$\frac{\Delta d'}{2}$$

due to a change of wing-tip slope $$\frac{\beta}{2}$$

is given by $$\frac{\Delta d'}{2} = l \sin\frac{\beta}{2} = \frac{l \times \beta}{2}$$

if $\beta$ is small, where $l$ is the vertical length of the support between wing-tip and coil.

Therefore $$\Delta d' = l\beta \quad (14)$$

From Equation 7.9 and 14 the required value of $l$ is given by an equation expressing the equality of changes in coupling due to translation and rotation i.e.

$$\frac{3(\Delta d - \Delta d')}{d} + \frac{\beta^2}{2} = 0$$

Therefore $$\frac{-3\Delta d'}{d} = -\left(\frac{3\Delta d}{d} + \frac{\beta^2}{2}\right) \quad (15)$$

for $$\Delta g = 0.7 \frac{\Delta d}{d} = +223 \times 10^{-6}$$

and $$\frac{\beta^2}{2} = -54 \times 10^{-6}$$

From Equations 14 and 15 it follows that:

$$\frac{-3l\beta}{d} = (670-54)10^{-6} = -616 \times 10^{-6}$$

$$l = \frac{d}{3\beta} 616 \cdot 10^{-6}$$

$$= \frac{732 \times 616 \cdot 10^{-6}}{3 \times 0.0104} \text{ ins. i.e. } l = 14.4 \text{ ins.}$$

Thus cancellation may be obtained for $\Delta g = 0.7$ by underslinging exactly coaxial or co-planar coils a distance of 36 cm. below the neutral axis of the wing tips.

It is also possible, of course, to achieve cancellation for any particular value of $g$ by both inclining the coils and mounting the coils below the wing.

In survey apparatus employing both horizontal co-planar coils or vertical coaxial coils together with vertical co-planar coils this latter method is particularly useful.

The compensation for changes in coupling between vertical co-planar coils due to translation caused by wing bending is achieved by mounting the coils below the wing. In cases therefore, where the transmitter coils and the receiver coils are in the form of aerial rods arranged in a symmetrical cross the coils may be mounted below the wing to an extent such that translational effects of the vertical co-planar coils are minimized. There only remains then the rotation response of the vertical rods (horizontal co-planar coils). If the rods are adjusted to be accurately parallel in steady flight ($\alpha = 0$) then the gust response for $\Delta g$ equal to 0.7 will be only about 50 parts per million and small for lower $\Delta g$ values. If gusts are asymmetrical, i.e. the increase in acceleration does not equal the associated decrease in acceleration then some value of $\alpha$ other than zero may be preferable in obtaining the least gust response. The cruciform installation is so arranged that $l$ may be adjusted on the ground and $\alpha$ may be adjusted to zero or nearly so in flight. The preferred procedure is to set to a calculated value check the gust response of channel B by flying in turbulent air at a height sufficient to eliminate ground conduction responses, and then make any necessary adjustment. Having obtained the optimum value of $l$ the angle $\alpha$ may be adjusted to give minimum gust response on channel A.

The receiving and transmitting cruciforms may be suspended from wing-tip extensions in the manner shown in FIGURE 2.

For vertical, co-planar coils it holds that the approach between the wing-tips may be reduced by providing the rods below the neutral axis of the wing section. If the wing-tip is bent upwards the rods will turn outwards with respect to the wing-tip (FIG. 1d). This outward movement may cancel the inwardly directed approach for any arbitrary value of $g$.

From FIG. 1d it is found that the outward movement $$\frac{\Delta d}{2}$$

due to a variation $\beta/2$ of the slope of the wing-tip is equal to $$\frac{\Delta d}{2} = l \sin \beta/2 = \frac{l \times \beta}{2}$$

if $\beta$ is small; here $l$ represents the vertical length of the suspension arrangement between wing-tip and coil.

Hence $$l = \frac{\Delta d}{\beta} = \frac{0.163}{0.0104} = 15.7$$

for complete compensation.

If, consequently, the coils are arranged below the wing so that the centre of the coil is located approximately 40 cms. below the axis of the wing, the undue effect in the case of gust of 0.7 g. will be minimized and it will be reduced for other values of $\Delta g$. The value of 0.7 for $\Delta g$ is higher than corresponds to the currents to be expected and for optimum reduction it will be necessary in any particular case to calculate the value of the effect for a number of values of $\Delta g$ and for $l$ to be expected and to set the coils accordingly.

In investigation apparatus comprising both horizontal co-planar coils and vertical co-axial coils in the form of aerial rods, the rods are preferably arranged in the form of a symmetrical cross and secured to extensions of the wings as shown in FIG. 2.

The vertical rod between the supporting tubes may be moved by means of its attachment and a solenoid operated from the cabin. Thus the cruciform assembly may be rocked about an axis approximately coinciding with the horizontal rod and by this means the angle between the transmitting and receiving rods may be adjusted in flight.

In addition, the distance from the neutral axis of the wing to the centre of the cruciform may be adjusted to the desired value of the ground by extending or shortening the support tubes.

Use is made of extensions approximately 60 cms. long preferably made from fibre-glass or other non-metallic material. At the extreme end of each extension two glass-laminate tubes of adjustable length are installed. To the bottom of these is attached the horizontal rod in the direction of flight.

It is to be understood that the structural data given above is given only to enable ready practice of the invention and is not meant in any way to limit the scope thereof, which scope is set forth in the following claims.

What is claimed is:

1. In aerial geophysical survey apparatus for determining the presence of ores or other conductive geological formations, a pair of transmitting coils for setting up a magnetic field, a pair of receiving coils for detecting said magnetic field, generator means connected to said transmitting coils for supplying a low frequency current thereto for generating said magnetic field, detector means connected to said receiving coils to detect the voltage induced therein by said magnetic field, an aircraft having wings for moving said transmitting and receiving coils over a geological formation, said transmitting coils being mounted at one wingtip and said receiving coils being mounted at the opposite wingtip of said aircraft, one of each of said pairs being horizontally mounted with respect to the wings and the other of each of said pairs being vertically mounted with respect to the wings, and means to rotate each of said pairs of coils, whereby the angle therebetween can be changed.

2. Apparatus as set forth in claim 1, wherein each of said pairs of coils is mounted below the wing of the aircraft.

3. In aerial geophysical survey apparatus for determining the presence of ores or other conductive geological formations, a pair of transmitting coils for setting up a magnetic field, a pair of receiving coils for detecting said magnetic field, generator means connected to said transmitting coils for supplying a low frequency current thereto for generating said magnetic field, detector means connected to said receiving coils to detect the voltage induced therein by said magnetic field, an aircraft including wings and a longitudinal axis extending between the wingtips for moving said pairs of coils and said generator and detector means over a geological formation, each of said pairs of coils being mounted on opposite wingtips, respectively, of said aircraft, each of said pairs of coils comprising a vertically oriented coil and a horizontally oriented coil at substantially right angles to each other, each of said pairs being located below the said longitudinal axis.

4. In aerial geophysical survey apparatus for measuring distortion of a magnetic field, said distortion being caused by ores or other conductive geological formations, a transmitting coil for setting up a magnetic field, generator means connected to said transmitting coil for supplying a low frequency current thereto for generating said magnetic field, a receiving coil for detecting said magnetic field, detector means connected to said receiving coil to detect the voltage induced therein by said magnetic field, said transmitting coil and said receiving coil being mounted on opposite wingtips of an aircraft, respectively, each coil having an axis, one of said coils being mounted such that its axis makes a small acute angle with respect to the axis of the other, said acute angle being such that changes in coupling of the coils caused by translation and rotation due to gusts are substantially minimized for a given range of gust loading conditions.

5. In aerial geophysical survey apparatus for determining the presence of ores or other conductive geological formations, a transmitting coil for setting up a magnetic field, a receiving coil for detecting said magnetic field, each coil having an axis, generator means connected to said transmitting coil for supplying a low frequency current thereto for generating said magnetic field, detector means connected to said receiving coil to detect the voltage induced therein by said magnetic field, an aircraft including wings and a longitudinal axis extending between the wingtips for moving said transmitting and receiving coils and said generator and detector means over a geological formation, said transmitting coil and said receiving coil being mounted on the opposite wingtips, respectively, of said aircraft below said longitudinal axis.

6. Geophysical survey apparatus as set forth in claim 5, wherein said transmitting coil and said receiving coil are initially mounted such that the coil axes make a small acute angle with respect to each other, said acute angle being such that changes in coupling of the coils caused by translation and rotation due to gusts are substantially minimized for a given range of gust loading conditions.

References Cited in the file of this patent

UNITED STATES PATENTS

| | | |
|---|---|---|
| 1,492,300 | Lowy | Apr. 29, 1924 |
| 2,201,256 | Barret | May 21, 1940 |
| 2,407,663 | Hart | Sept. 17, 1946 |
| 2,559,586 | Bjarmason | July 10, 1951 |
| 2,623,924 | Cartier | Dec. 30, 1952 |
| 2,636,924 | Lundberg et al. | Apr. 28, 1953 |
| 2,794,949 | Hedstrom et al. | June 4, 1957 |
| 3,015,060 | McLaughlin et al. | Dec. 26, 1961 |